US005712681A

United States Patent [19]

Suh

[11] Patent Number: 5,712,681
[45] Date of Patent: Jan. 27, 1998

[54] APPARATUS FOR INPUTTING AND OUTPUTTING AN OPTICAL IMAGE WITH MEANS FOR COMPRESSING OR EXPANDING THE ELECTRICAL VIDEO SIGNALS OF THE OPTICAL IMAGE

[75] Inventor: Inh-Seok Suh, Suwon, Rep. of Korea

[73] Assignee: Samsung Aerospace Industries, Ltd., Kyeongsangnam-do, Rep. of Korea

[21] Appl. No.: 453,063

[22] Filed: May 26, 1995

[30] Foreign Application Priority Data

May 31, 1994 [KR] Rep. of Korea ............... 94-12092

[51] Int. Cl.[6] ............................................. H04N 5/76
[52] U.S. Cl. ............................................. 348/231; 348/222
[58] Field of Search ............................ 345/202; 348/231, 348/233, 220, 222, 240; 358/909.1, 906; H04N 5/76, 5/225

[56] References Cited

U.S. PATENT DOCUMENTS 5,016,107  5/1991  Sasson et al. ........................ 358/906
5,428,389  6/1995  Ito et al. .............................. 348/231
5,467,129  11/1995 Suzuki ................................. 348/231
5,473,370  12/1995 Moronaga et al. .................. 348/231
5,532,740  7/1996  Wakui ................................. 348/231

Primary Examiner—Michael H. Lee
Attorney, Agent, or Firm—Finnegan, Henderson, Farabow, Garrett & Dunner, L.L.P.

[57] ABSTRACT

An apparatus for inputting and outputting the optical image of a scene with means for compressing and expanding the electrical video signals of the optical image. Electrical video signals of the optical image are produced. A buffer memory temporarily stores the electrical video signals. A digital encoder encodes the electrical video signals to produce NTSC or PAL signals displayed on a television set, monitor, or color liquid crystal display (LCD). A compression/expansion circuit compresses or expands the electrical video signals to produce compressed or expanded image data. A memory card stores the compressed image data, and a microprocessor controls the operation of the apparatus. Thus, the electrical video signals are compressed or expanded to be permanently stored in the memory card as the image data or transferred to the digital encoder as recovered video signals.

16 Claims, 3 Drawing Sheets

APPARATUS FOR INPUTTING AND OUTPUTTING AN OPTICAL IMAGE WITH MEANS FOR COMPRESSING OR EXPANDING THE ELECTRICAL VIDEO SIGNALS OF THE OPTICAL IMAGE

BACKGROUND OF THE INVENTION

1. Field of the Invention

The present invention relates to an apparatus for inputting and outputting an optical image of a scene, and more particularly, means for compressing or expanding the electrical video signals of the optical image.

2. Discussion of the Related Art

An optical image of a scene may be stored in an optical filing system or computer system as follows:

1. The optical image is converted into NTSC video signals and inputted into the computer system via an additional NTSC-VGA conversion circuit. This requires additional hardware and software such as an image grabber.

2. An ordinary picture from a conventional camera is scanned by a scanner to produce electrical image data which is stored in a computer system. With this system, the image cannot be viewed instantly at the time of exposure to correct a defective image.

Moreover, the amount of image data stored requires a storage device of great capacity, thus reducing the storage efficiency. Also, a long time is needed to send the image data via a communication line, increasing the cost of communication.

SUMMARY OF THE INVENTION

It is an object of the present invention to provide an apparatus for inputting and outputting an optical image of a scene with means for viewing the image instantly at the time of exposure through an electronic finder such as a color liquid crystal display (LCD).

It is another object of the present invention to provide an apparatus for inputting and outputting the optical image of a scene with means for storing the image data in a computer.

It is still another object of the present invention to provide an apparatus for inputting and outputting the optical image of a scene with means for using a memory card to store the image data without an additional device such as a scanner or an image grabber.

It is a further object of the present invention to provide an apparatus for inputting and outputting the optical image of a scene with means for compressing and expanding the image data so as to increase the efficiency of the data storage space.

In order to achieve the above objects, the present invention employs the following technical principles:

1. Compression and expansion of the image data representing the video signals according to the international standard of the Joint Photographics Experts Group (JPEG).

2. Using a semiconductor memory card connected to a computer according to the standard of PCMCIA 2.0.

3. Integrally associating a color LCD with the imaging apparatus so as to allow instant viewing of the images at the time of imaging.

The present invention, as embodied and broadly defined herein, provides a picture imaging device for imaging an object comprising means for providing a digital data representation corresponding to an image of an object an expansion/compression circuit, coupled to the providing means, for compressing the digital data representation and a memory means, coupled to the expansion/compression circuit, for storing a compressed digital data representation.

According to one aspect of the present invention, the providing means comprises means for capturing an image of an object and means, coupled to the capturing means, for converting a captured image into a digital data representation.

According to another aspect of the present invention, the providing means comprises means for externally inputting to the expansion/compression circuit a video signal containing the digital data representation.

According to still another aspect of the present invention, the expansion/compression circuit comprises means for expanding the compressed digital data representation to a decompressed digital data representation.

According to yet another aspect of the present invention, the picture imaging device further comprises selector means for selectively coupling one of the providing means and the expansion/compression circuit to provide a picture signal.

Further, the memory means of the inventive picture image device may include a memory card detachable from the picture imaging device.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DESCRIPTION OF THE PREFERRED EMBODIMENTS

An apparatus for inputting and outputting the optical image of a scene with means for compressing or expanding the electrical video signals of the optical image according to an embodiment of the present invention will be described with reference to FIGS. 1A and 1B and comprises an external image input means for inputting the electrical video signals of the optical image of a scene. A compression/ expansion circuit 8 compresses or expands the electrical video signals to store the optical image data into a memory card 10 or output it to a color liquid crystal display (LCD) 18. A microprocessor 15 controls the operation of the entire system.

Figure 1A:
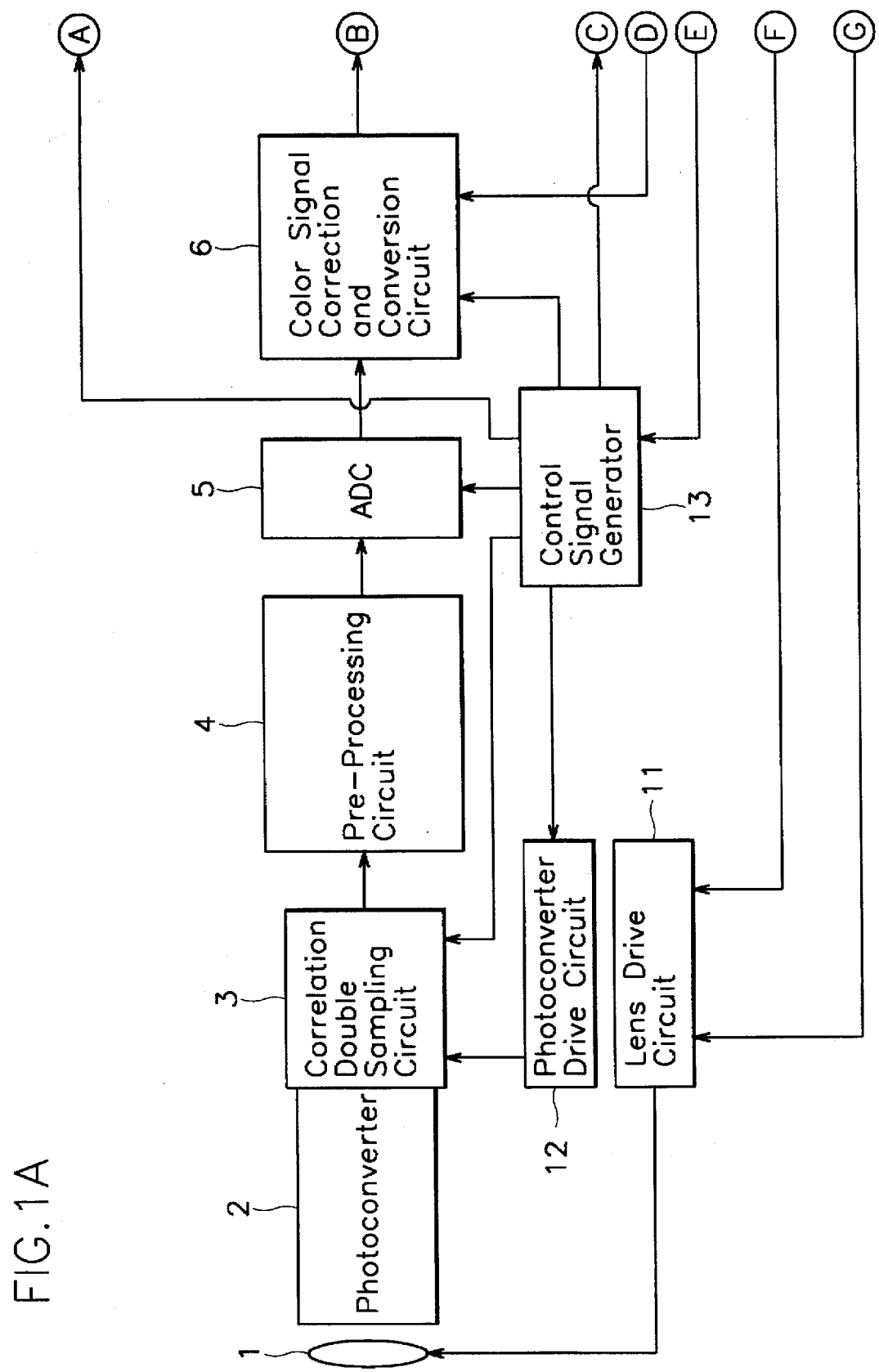
FIGS. 1A and 1B are block diagrams for illustrating an apparatus for inputting and outputting an optical image of a scene with means for compressing or expanding the electrical video signals of the optical image according to an embodiment of the present invention.
Figure 1B:
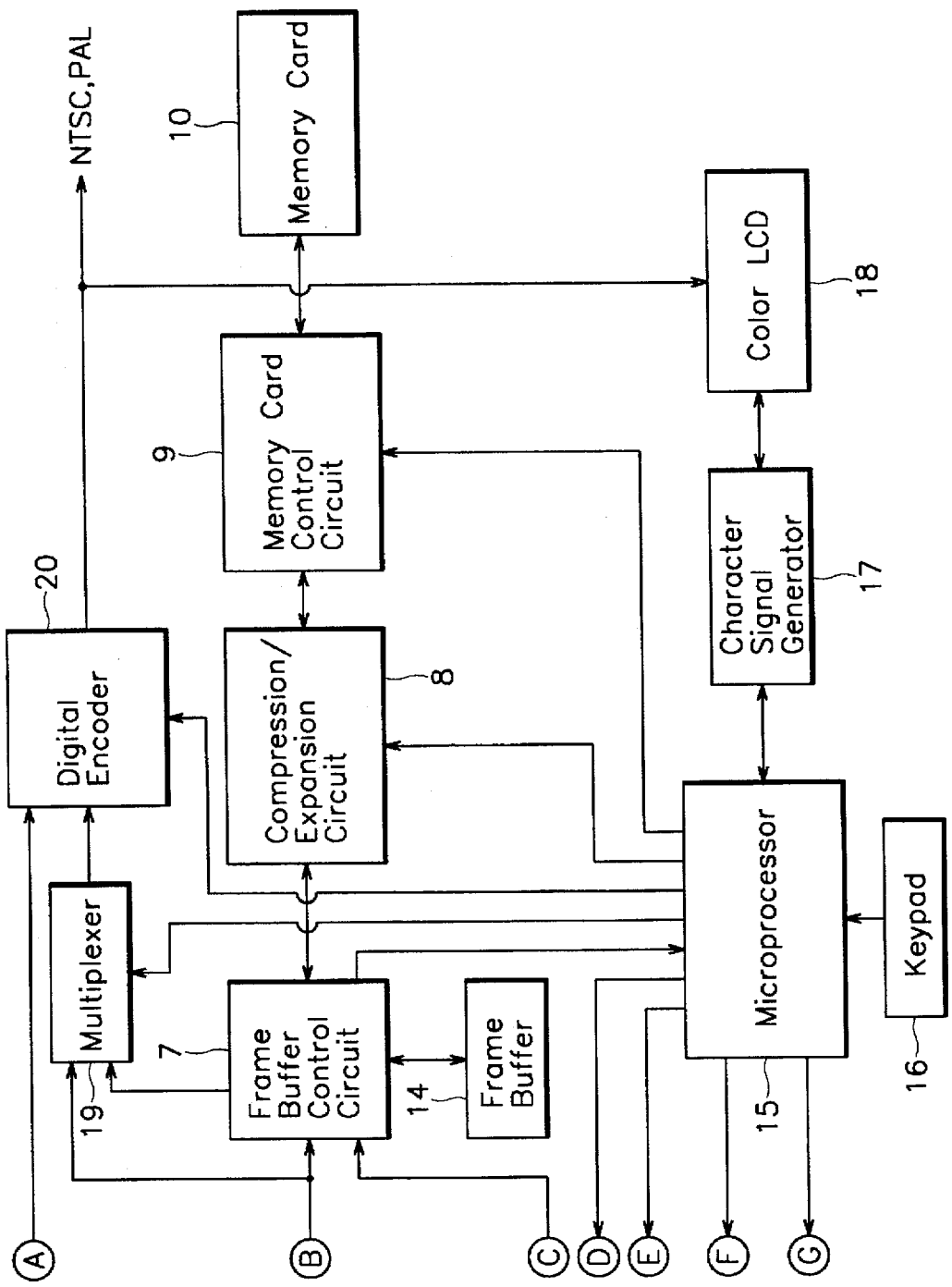

As shown in FIGS. 1A and 1B, an optical lens 1 produces an optical image, and a lens drive circuit 11 drives the lens 1. A photoconverter 2 converts the optical image into an electrical video signal, and a photoconverter drive circuit 12 drives the photoconverter 2. A correlation double sampling circuit 3 samples the electrical video signal from the photo converter 2 and produces a set of discrete values representing the image data. A pre-processing circuit 4 converts the image data signals into an international standard analog signal (e.g., R G B, Y Cb Cr). An analog to digital converter (ADC) 5 converts the output of the pre-processing circuit 4 into a digital form. A color signal correction and conversion circuit 6 corrects chromatic aberration due to the defects of the light source, lens, prism, or the time constant of the preceding circuit sta es. A control signal generator 13 generates the control signals for the entire system.

The output of the color signal correction and conversion circuit 6 is sent to a frame buffer control circuit 7, a frame buffer 14, and a multiplexer 19. An output of the frame buffer control circuit 7 is also connected to the multiplexer 19. The frame buffer 14 stores digital video signals. The frame buffer control circuit 7 controls the frame buffer 14. The output of the multiplexer 19 is encoded by a digital encoder 20 to produce NTSC or PAL signals.

The compression/expansion circuit 8 is connected to the frame buffer control circuit 7 and a memory card control circuit 9. The memory card control circuit 9 controls a memory card 10 so as to compress or expand the output of the frame buffer control circuit 7. The memory card control circuit 9 stores or recovers the image data into or from the memory card 10.

The microprocessor 15 controls the operation of the entire system. A keypad 16 enters selected options into the microprocessor 15. A character signal generator 17 produces character signals which are then displayed on a color LCD 18.

In operation, the lens 1 produces an optical image and, of course, may include a zoom lens. The microprocessor 15 sends a zoom signal and a focus adjustment signal to the lens drive circuit 11 which adjusts the focus of the optical lens 1. The photoconverter 2 converts the optical image from the lens 1 into electrical video signals applied to the correlation double sampling circuit 3. The control signal generator 13 generates control signals for the photoconverter drive circuit 12 and the double correction sampling circuit 3 in response to commands from the microprocessor 15. The photoconverter drive circuit 12 converts the control signal of the control signal generator 13 into a drive signal applied to the photoconverter 2. The drive signal and the video signal produced from the photoconverter 2 are separated by the correlation double sampling circuit 3 which applies the video signal to the pre-processing circuit 4.

The pre-processing circuit 4 converts the video signal of the correlation double sampling circuit 3 into an international standard analog signal (R G B, Y Cb Cr) applied to the ADC 5. The ADC 5 converts the analog video signal into a digital signal and applies the digital signal to the color signal correction and conversion circuit 6. The color signal correction and conversion circuit 6 corrects the chromatic aberration of the digital signal of the ADC 5 due to the defects of the light source, lens, prism, and the time constant of the circuit. The color signal correction and conversion circuit 6 sends its output to the multiplexer 19 and the frame buffer control circuit 7.

There are three causes of chromatic aberration: the optical elements, the time constant of the circuit, and the exposure light. Aberrations from optical elements, the lens and prism, and the time constant of the circuit can be corrected when designing the apparatus. Aberrations from the light source, however, depend on the situation where the images are taken and, therefore, can only be resolved considering the situation. Namely, the physical properties of the lens and prism and the time constant are determined when designing the apparatus, but the light is always variable.

The correction of chromatic aberration is more specifically described as follows. The electrical video signal inputted initially for one sixtieth of a second at maximum is stored in the frame buffer 14 under the control of the frame buffer control circuit 7. At this time, the color signal correction and conversion circuit 6 corrects the chromatic aberration due to the lens and prism and the time constant of the circuit. The microprocessor 15 analyzes the video signal data stored in the frame buffer 14 under the control of the frame buffer control circuit 7. The microprocessor 15 obtains correction coefficients for the light source and applies the corrected coefficients to the color correction and conversion circuit 6. The corrected color signals are then inputted into the frame buffer control circuit 7 through the color signal correction and conversion circuit 6 after the initial input of the video signal.

Additionally, the color signal correction and conversion circuit 6 converts the input video signals R, G, B into the signals Y, Cb, Cr. This color space conversion reduces the amount of data to two third in comparison to the R, G, B signals.

Thus, the corrected video signals are stored in the frame buffer 14 under the control of the frame buffer control circuit 7. The video signal data stored in the frame buffer 14 is applied to the compression/expansion circuit 8 for compression under the control of the frame buffer control circuit 7. The compression/expansion circuit 8 compresses the video signal data according to the JPEG standard to output the compressed data stored in the memory card 10 of PCMCIA under the control of the memory card control circuit 9.

The compression/expansion circuit 8 performs a discrete cosine transform (DCT) of the video signal to transform the spatial information of the video signal into the type of frequency wherein the energy of the video signal is concentrated in a few DCT coefficients resulting in the primary compression of the video signals. The DCT coefficients representing the primarily compressed video signal data are uniformly quantized to have 64 discrete quanta according to the quantization table with 255 values. In the quantization table, the compression ratio is increased with an increase of the value.

As the compression ratio is increased, however, the quality of the recovered image deteriorates. Hence, it is desirable to compress the video signal data within a range yielding a visually distinguishable image when recovered. The microprocessor 15 provides the compression/expansion circuit 8 with one of the quantization values according to the user's selection through the keypad 16.

Finally, entropy encoding is performed to further compress the image data. This process maps short code words onto frequently appearing coefficients and long code words onto rarely appearing coefficients, thereby reducing the average amount of the image data.

The two kinds of processes in JPEG are Huffman coding and arithmetic coding. The compressed data of the compression/expansion circuit 8 is transferred to the memory card control circuit 9, which stores the compressed data transformed into a DSC file format with a heading in the memory card 10.

Meanwhile, the corrected color signal of the color signal correction and conversion circuit 6 is applied to the frame buffer control circuit 7 and to the multiplexer 19. The multiplexer 19 selectively outputs the corrected color signal to the digital encoder 20 under the control of the microprocessor 15. The digital encoder 20 is synchronized with the synchronizing pulses of the control signal generator 13 encoding the output signal of the multiplexer 19 into the NTSC or PAL signal transferred to an external monitor or television. Additionally the NTSC or PAL signal is projected on the color LCD 18 attached to the present apparatus, whereby the user may view the presently pictured images.

The character signal generator 17 outputs the character signals to the color LCD 18 under the control of the microprocessor 15. The character signals display, on the color LCD 18, the mode and condition of picturing, the condition of the memory card, etc.

In the projection mode selected by the user through the keypad 16, the microprocessor 15 sends a projection mode signal to the multiplexer 19, compression/expansion circuit 8, and memory card control circuit 9 to reverse the data flow. Namely, the data flows from the memory card 10, to the memory card control circuit 9, to the frame buffer control circuit 7, and then to the multiplexer 19. The multiplexer 19, under the control of the microprocessor 15, selects the input from the frame buffer control circuit 7, and sends the input to the digital encoder 20. The color LCD 18 receives and displays the video signal. Thus, the compressed image data of the memory card 10 is sequentially read out by the memory card control circuit 9, expanded through the compression/expansion circuit 8, and stored in the frame buffer 14 through the frame buffer control circuit 7.

The expanded image data stored in the frame buffer 14 is in turn transferred to the multiplexer 19 via the frame buffer control circuit 7 and applied to the digital encoder 20. The expansion of the image data is the reverse of the compression and, therefore, comprises the steps of performing entropy decoding of the data using the Huffman table of the compression, quantizing the data using the quantization table of the compression, and performing the reverse discrete cosine transform, thereby recovering the image data.

Figure 2:
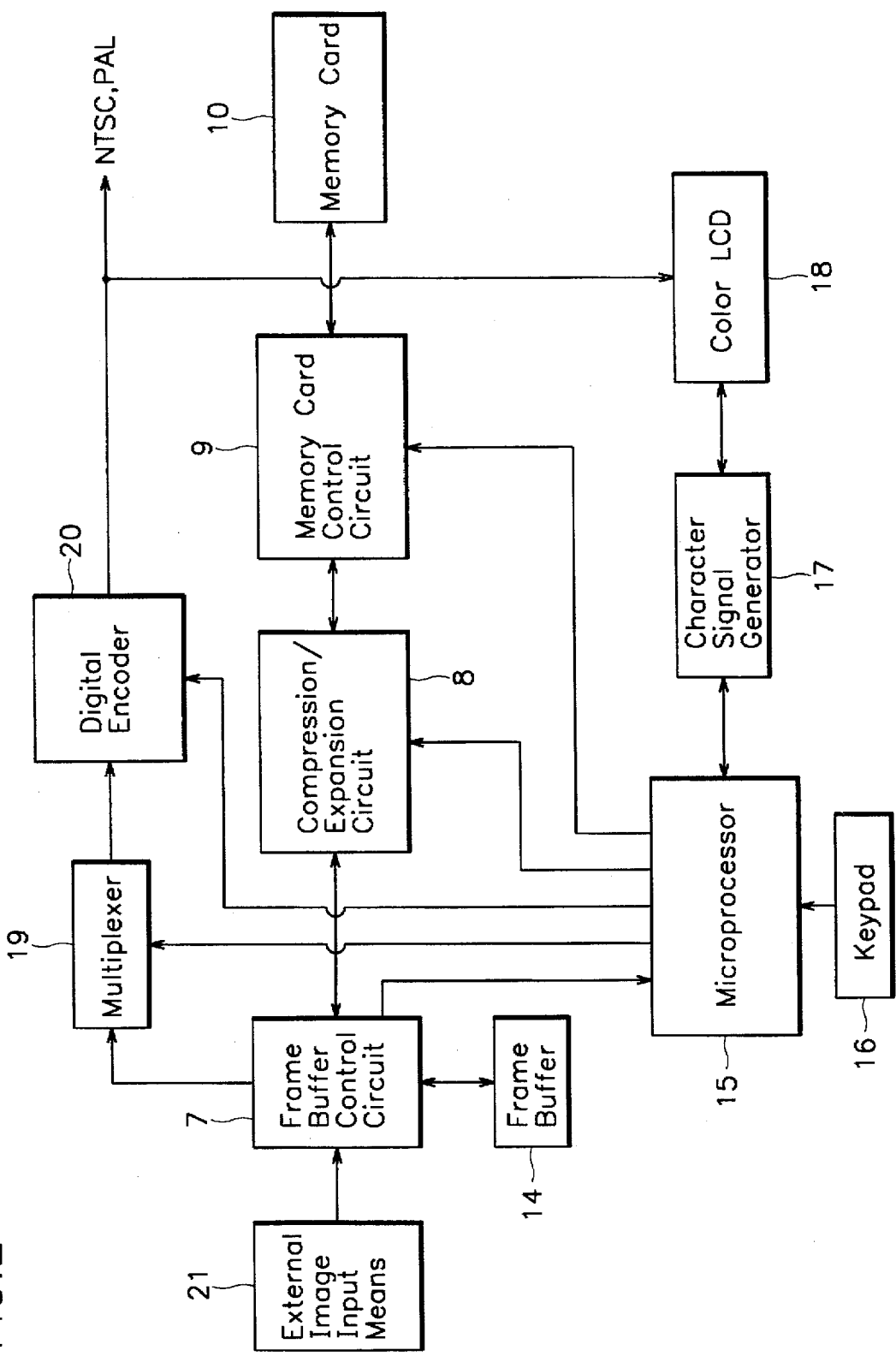
FIG. 2 is a block diagram similar to FIGS. 1A and 1B according to another embodiment of the present invention.

FIG. 2 illustrates another embodiment of the present invention similar to FIG. 1. The only difference is to receive externally input image data. Namely, instead of the optical lens 1, photoconverter 2, correlation double sampling circuit 3, preprocessing circuit 4, ADC 5, color signal correction and conversion circuit 6, photoconverter drive circuit 12, lens drive circuit 11, and control signal generator 13 as shown in FIG. 1A, the embodiment shown in FIG. 2 employs an external image input means 21 to directly receive the image data signals.

Preferably, the present invention employs the image standard JPEG, personal computer memory card interface standard PCMCIA, and file format standard DOS to maximize the compatibility. Thus, the inventive apparatus may be used as an input means for the computer video communication and an electronic camera substituting for a conventional film camera in addition to the three dimensional image input apparatus. Of course, other formats may be used.

The characteristic effects of the inventive apparatus are summarized as follows:

1. When used as a substitute for a conventional film camera, the scenes are instantly displayed on a TV set, monitor, or color LCD at the time of imaging.
2. The memory card stores a very large number of images (e.g., possibly storing about 640 cuts in the case of a 64 MB memory).
3. The memory card can store new image data over one hundred thousand times, thus being almost permanently reusable.
4. The memory card is used like a floppy disk for a computer without additional means, so that the number of memory cards to be used is almost unlimited.
5. The technique for compressing the image data selectively from a half to one thirtieth is employed to economize the storage of the memory card.
6. The time required for the video communication is considerably reduced.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A picture imaging device for imaging an object, comprising:

means for providing a digital data representation corresponding to an image of an object;

means for receiving user-entered input requests;

an expansion/compression circuit, coupled to the means for providing and means for receiving, for compressing the digital data representation with one of a predetermined default value or a variable compression value in accordance with the user-entered input requests;

memory means, coupled to the expansion/compression circuit, for storing a compressed digital data representation;

selector means for selectively coupling one of the providing means and the expansion/compression circuit to provide a picture signal; and display means, coupled to the selector means, for displaying an image representing the picture signal.

2. The picture imaging device of claim 1, wherein the providing means includes:

means for capturing an image of an object; and means, coupled to the capturing means, for converting a captured image into a digital data representation.

3. The picture imaging device of claim 1, wherein the providing means includes means for externally inputting to the expansion/compression circuit a video signal containing the digital data representation.

4. The picture imaging device of claim 1, wherein the expansion/compression circuit includes means for expanding the compressed digital data representation to a decompressed digital data representation.

5. The picture imaging device of claim 1, wherein the memory means includes a memory card detachable from the picture imaging device; and a memory card controller for controlling the memory card in order to store or read the digital representation.

6. The picture imaging device of claim 2, wherein the converting means comprises a photoconverter and an analog to digital converter.

7. The picture imaging device of claim 2, wherein the capturing means includes an imaging lens.

8. The picture imaging device of claim 2, wherein the providing means further comprises means, coupled to the converting means, for correcting the digital data representation.

9. The picture imaging device of claim 1, wherein the selector means includes a multiplexer.

10. The picture imaging device of claim 1, further comprising a digital encoder, coupled to the selector means, for encoding the picture signal to produce a corresponding NTSC or PAL signal.

11. The picture imaging device of claim 6, wherein the converting means further comprises a correlation double sampling circuit, coupled between the photoconverter and the analog to digital converter, for sampling a photoconverted signal to produce a set of discrete values representing the image of an object.

12. The picture imaging device of claim 8, wherein the correcting means includes a color signal correction and conversion circuit for correcting chromatic aberration.

13. The picture imaging device of claim 1, wherein the display means includes a liquid crystal display.

14. The picture imaging device of claim 1, wherein the display means includes means for generating character signals to display characters on the display means.

15. The picture imaging device of claim 11, whererin the converting means further comprises a pre-processing circuit, coupled to the sampling circuit, for converting the set of discrete values into an international standard analog signal.

16. The picture imaging device of claim 1, wherein the expression/compression circuit compresses the digital data representation according to the Joint Photographic Experts Group (JPEG) standard.

\* \* \* \* \*